Dec. 5, 1933.   E. J. LAUTERBUR ET AL   1,938,294
PROOFING AND BAKING APPARATUS
Filed March 18, 1931   5 Sheets-Sheet 3
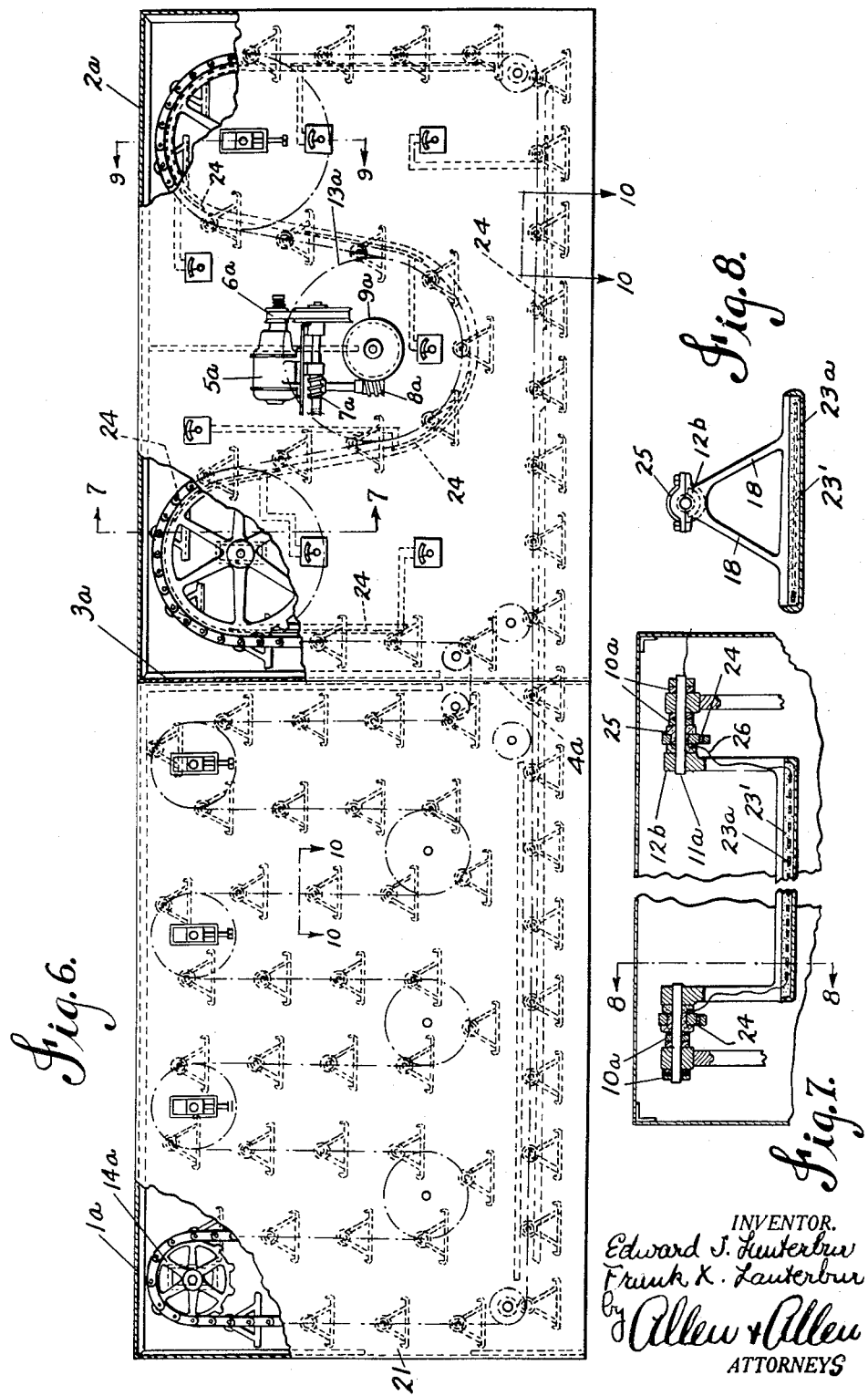
INVENTOR.
Edward J. Lauterbur
Frank X. Lauterbur
by Allen & Allen
ATTORNEYS

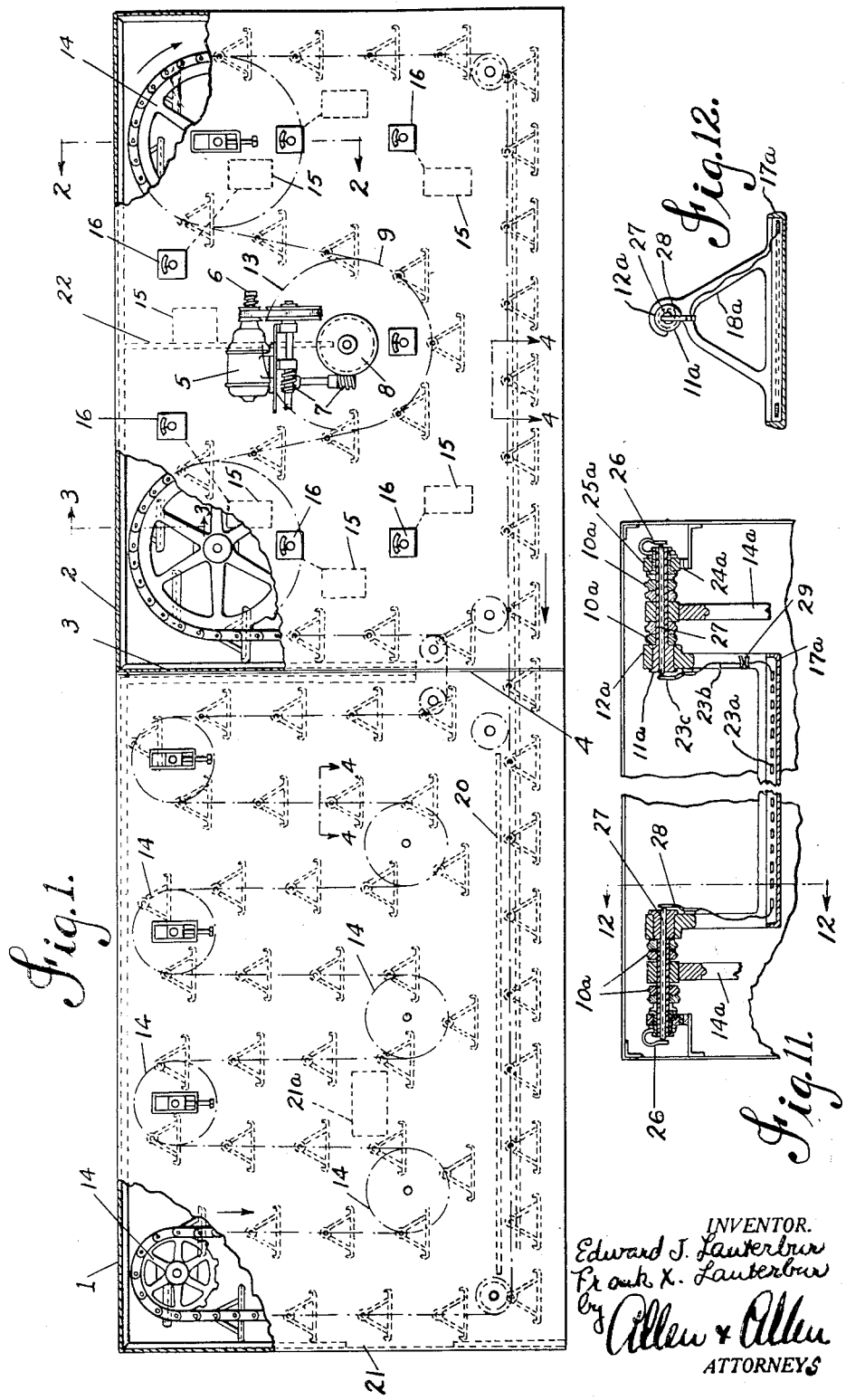

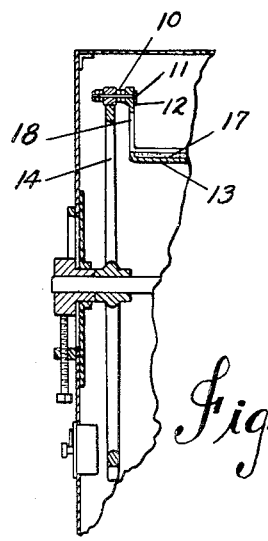
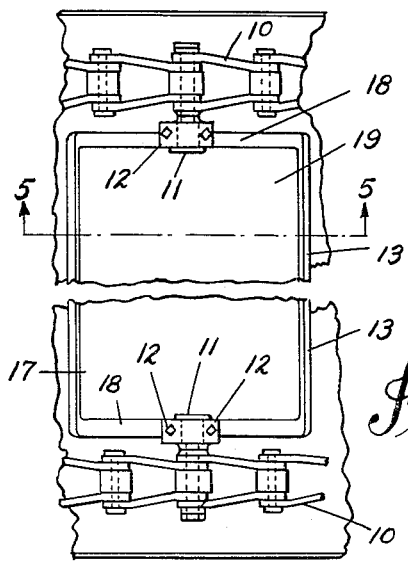
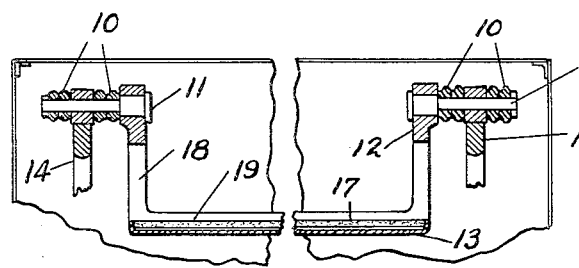
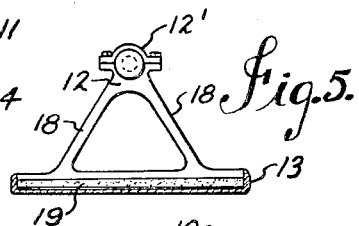
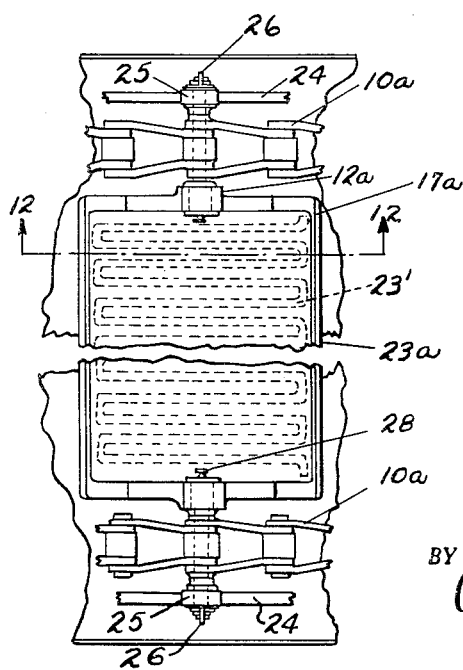
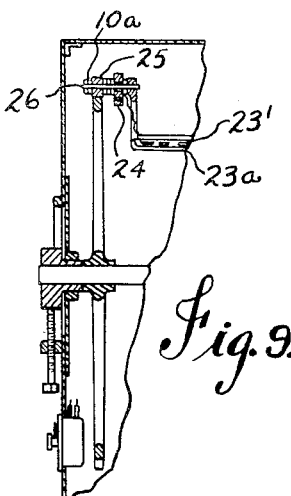

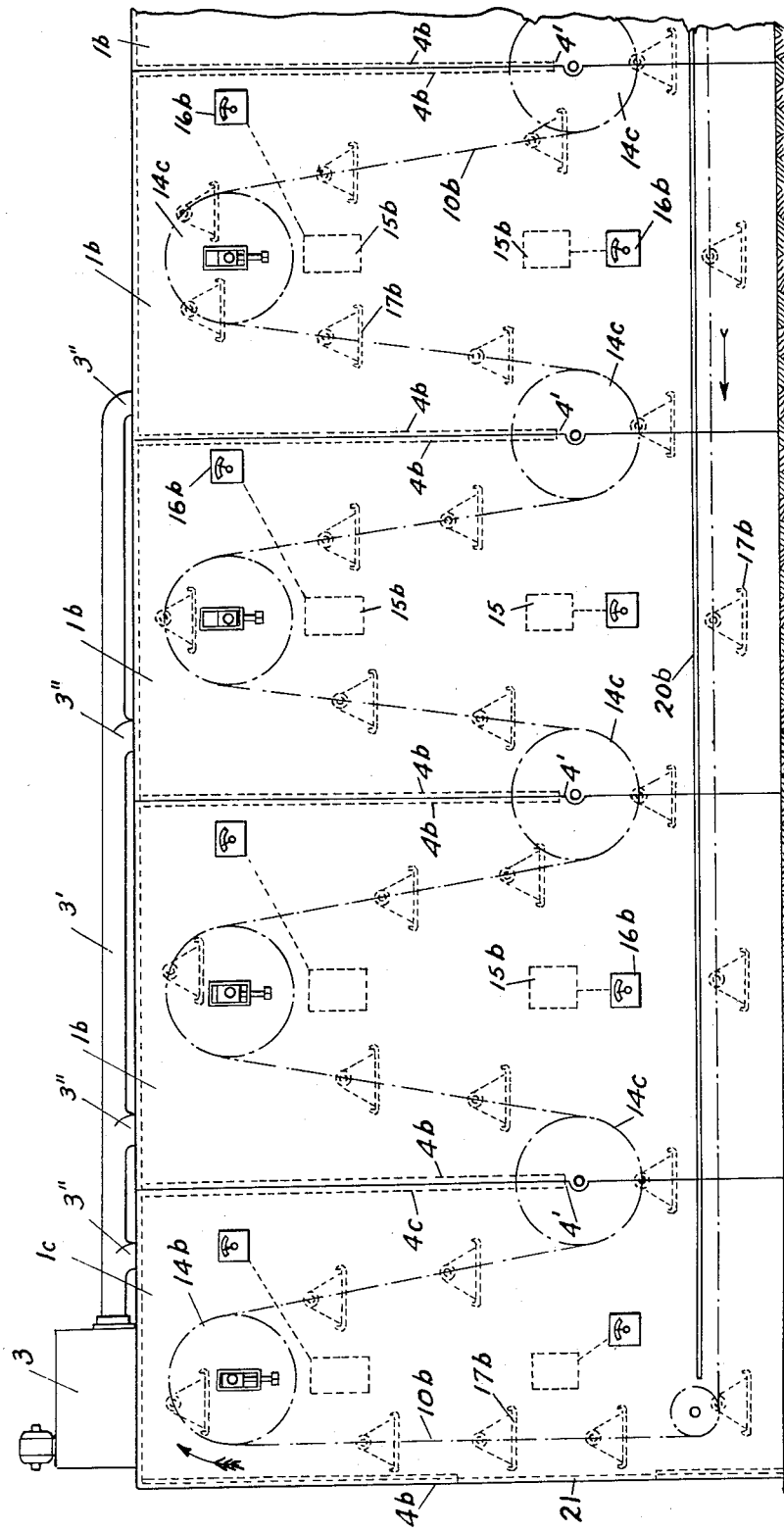

Dec. 5, 1933.  E. J. LAUTERBUR ET AL  1,938,294
PROOFING AND BAKING APPARATUS
Filed March 18, 1931   5 Sheets-Sheet 5

INVENTOR.
Edward J. Lauterbur
Frank X. Lauterbur
BY Allen & Allen
ATTORNEYS

Patented Dec. 5, 1933

1,938,294

UNITED STATES PATENT OFFICE 1,938,294

PROOFING AND BAKING APPARATUS

Edward J. Lauterbur and Frank X. Lauterbur, Sidney, Ohio; Wilhelmina S. Lauterbur and Leo V. Lauterbur executors of said Frank X. Lauterbur, deceased Application March 18, 1931. Serial No. 523,520

13 Claims. (Cl. 107—57)

Our invention relates to a combined proofing and baking apparatus in which molded loaves, either in pans, or on hearths, pass continuously through first the proofing cabinet and then the baking oven.

While the use of tray conveyors for baking ovens has been suggested in the prior art, as far as we are aware, no one has heretofore suggested the combination of a conveyor with a cabinet and baking oven in which the molded loaves pass first through the proofing enclosure and then through the baking oven.

Heretofore, proofing cabinets have been provided with shelves and it has been customary to place the molded loaves either in pans or on the shelves and allow them to remain in the cabinets desired lengths of time. The pans or loaves have then been removed from the cabinet to the hearths in a baking oven.

It is an object of our invention to provide a continuous conveyor in which the conveyor passes over sprockets arranged in staggered rows, so that the conveyor passes through a series of U shaped loops. Such construction provides great economy of space.

It is another object of our invention to provide a combined proofing cabinet and baking oven in which the pans or hearths can be placed on the trays in the proofing cabinet, carried automatically through the proofing cabinet, then conveyed through the baking oven in which the temperature is controlled for desired baking conditions, and in which the trays or hearths are then reconveyed underneath the proofing cabinet back to substantially the initial position for loading the trays.

Another object in the particular type of conveying mechanism which we preferably employ, is to return the trays through the proofing cabinet so that the baked loaves can be cooled off, and also so that the heat of the loaves will be utilized to conduce a desired condition of heating and humidity within the proofing compartment.

It is an object of our invention to provide the baking oven with a series of heating units and thermostatic controls for the units arranged at different stations along the path of travel of the trays than are the heating units, so that the thermal control affects the baking temperature at positions other than those where the thermal units are located.

It is an optional object of our invention to provide a baking oven, or a combined proofing and baking apparatus, in which, if hearths are employed, the hearths themselves may be removable from the trays, or the hearths may be permanently placed on the trays and the loaves themselves may be removed.

Another object in the particular type of conveyor which we employ, in which the conveyor travels throughout a series of inverted U shaped loops, is that by loading from the side of the cabinet, the time of proofing can be varied. For example, if the conveyor in the proofing cabinet has four series of up and down flights, by loading from the sides on the second flight instead of the first, the time of proofing will be reduced substantially twenty-five percent.

Another object of our invention which accommodates itself to the arrangement of the conveyor, is that vertical baffles may be utilized to subdivide the interior space of the structure, and so distribute the heating means that certain temperature conditions may be maintained in one compartment while different temperature conditions can be maintained in the other, making it possible for any compartment or group of compartments to function either as a proofing means or an oven, or as a cooling or humidifying device.

An object of one particular arrangement is to provide apparatus in which the heating units are mounted within the trays themselves and in which certain sections of the conveyor have electrified tracks so arranged that current, controlled by thermostats, may be caused either to pass through the heat units or cut off from the units, during desired stages of the baking operation, according to the actual heat of the oven where the thermostats of the respective sections are stationed.

The above objects and other objects to which reference will be made in the ensuing disclosure, we accomplish by that certain arrangement of parts of which we have illustrated several preferred embodiments.

Referring to the drawings:

Figure 1 is a diagrammatic side elevation showing a preferred arrangement of heating units independent of the trays.

Figure 2 is a detailed sectional view taken along the line 2—2 of Figure 1.

Figure 3 is a detailed sectional view taken along the line 3—3 of Figure 1.

Figure 4 is a detailed sectional view taken along the line 4—4 of Figure 1.

Figure 5 is a detailed sectional view taken along the line 5—5 of Figure 4.

Figure 6 is a diagrammatic side elevation of a modification in which the trays follow behind the heat units, and in which electrified track sections cause the heat units to be energized for desired intervals during the travel through the oven.

Figure 7 is a detailed sectional view taken along the line 7—7 of Figure 6.

Figure 8 is a detailed sectional view taken along the line 8—8 of Figure 7.

Figure 9 is a detailed sectional view taken along the line 9—9 of Figure 6.

Figure 10 is a horizontal detailed sectional view taken along the line 10—10 of Figure 6.

Figure 11 shows a modification of the tray construction of the type shown in Figure 5, in which the tray has a self contained heat unit.

Figure 12 is a sectional view taken along the line 12—12 of Figure 11.

Figures 13 and 14 are, collectively, a side elevation of apparatus embodying another modification, intermediate parts being omitted.

Figure 14:
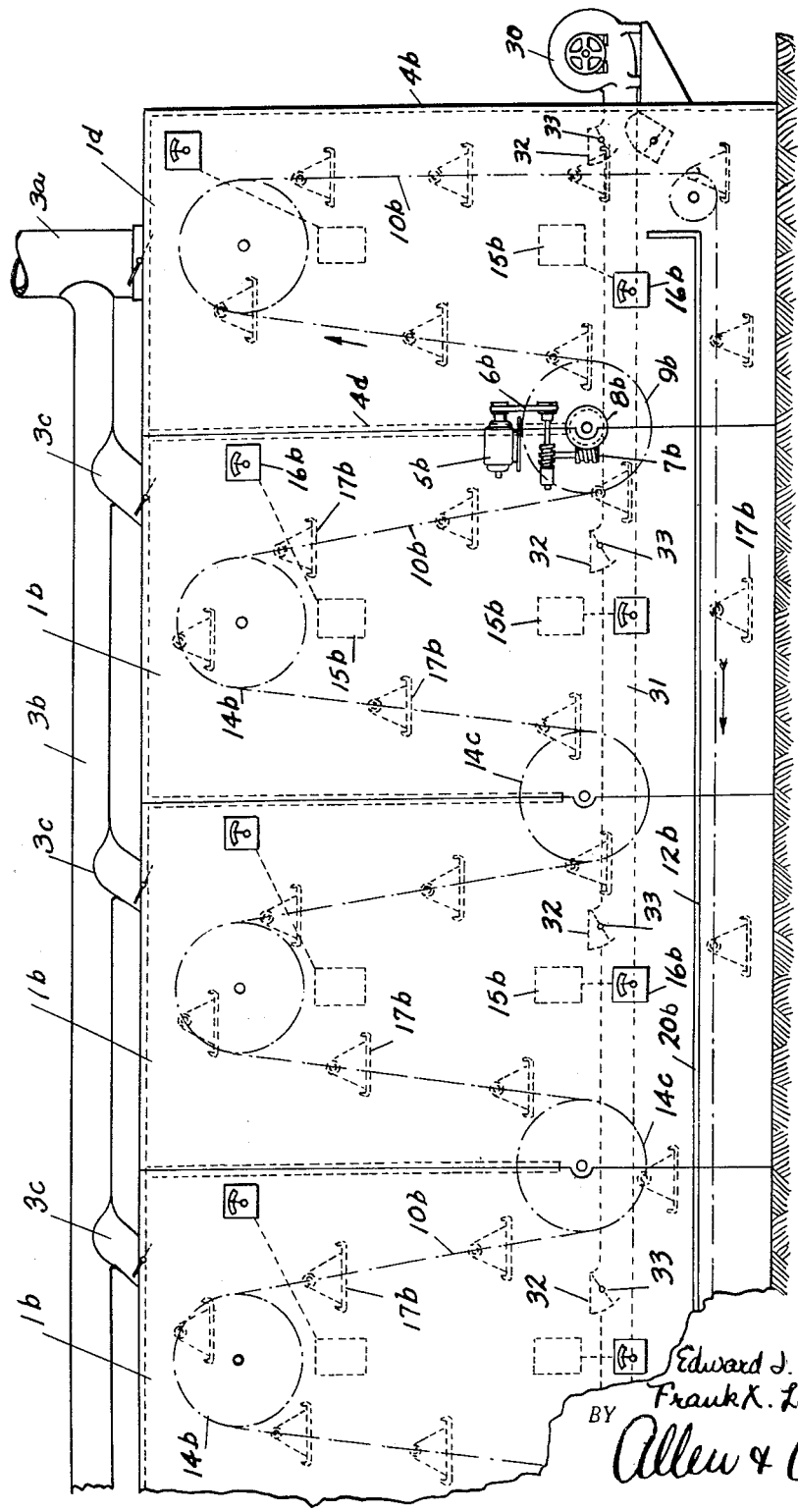

Referring first to Figure 1, it will be observed that we have illustrated a proofing cabinet 1, and baking oven 2, with a baffle wall 3 between them, which prevents temperature conditions within the oven from being materially affected by the temperature conditions within the cabinet. This wall 3 leaves an opening 4 at its bottom which permits the continuous tray conveyor to move unobstructed from the cabinet 1 into the oven 2.

An electric motor 5 is mounted on the side of the baking oven, and is provided with speed reducing gearing 6, on one of the shafts of which is fixed a worm 7, which meshes with the worm gear 8, fixed on the same shaft with the main driving sprocket wheel 9. Referring to Figures 2, 3 and 4, the conveyor is composed of spaced chains 10 with studs 11 extending in and having journaled on them, by split bearings 12', the yokes 12 of the tray carriages 13.

These spaced chains 10 also engage the series of sprockets 14, and due to the staggered arrangement of the sprockets the conveyor passes through the cabinet and oven in the series of U and inverted U formations indicated. In Figure 1, we have diagrammatically shown a series of heat units 15 controlled by thermostats indicated at 16. It is a feature of our invention that the thermostatic controls affect the heating units at a different position than those positions where the thermostats are mounted. The object of this arrangement is to prevent overheating of the loaves during their movement through the oven. If the heating units were located at the same positions as the thermostats, when the thermostats indicated a critical temperature had been reached, it would then be too late to cool down the oncoming trays. Since the thermostats are removed from the heat units, they work to regulate the temperature of the advancing trays so that by the time the trays reach the thermostats, corrective temperature conditions have already been induced.

From the split yokes 12, the trays 17 are suspended by means of inverted V shaped supporting arms 18. The trays indicated in Figures 3, 7 and 8 are shown with removable hearths 19. As stated, the hearths may be removed with the loaves which they are carrying, or the loaves may be removed from the hearths, and the hearths may travel continuously around with the trays.

It will be observed from Figure 1, that a baffle 20 is provided under which the conveyor passes on its return from the baking oven into the proofing cabinet. By sprinkling moisture on the baffle 20, the heat of the returning loaves and trays may be utilized to create a desired condition of humidity in the proofing cabinet.

Ordinarily the proofing cabinet is provided with a door 21 which enables the utilization of the full length of the conveyor for proofing and baking. However, under some conditions it may be desired to load the trays from a side door such as is indicated at 21a, in which case only part of the length of the conveyor will be used for proofing. It may further be desirable to provide a partition such as is indicated at 22, in the baking oven, so that part of the oven may be utilized for baking at a certain temperature, and the remainder of the oven for baking at a different temperature. As a further alternative, the discharge side of the baking oven may be utilized for cooling.

It will be obvious that with the arrangement of thermostats and heat units in the oven, a great variety of different conditions may be obtained which will be desirable for different types of baking.

Referring now to Figure 6, the proofing cabinet is indicated at 1a, and the baking oven at 2a. A divisional wall 3a divides the cabinet and the oven. The lower end of the wall 3a is cut away as indicated at 4a, to provide an opening through which the trays and conveyor may pass.

An electric motor 5a through the belt drive 6a, rotates the worm 7a which in turn rotates the worm 8a. The worm 8a actuates the gear 9a. The conveyor is composed of spaced chains 10a. A hollow shaft 11a provides a journal for the hook shaped collar 12a by which the trays 17a are suspended.

The driving sprocket 13a is mounted on the shaft on which the gear 9a is mounted, and as in the other modification, the endless conveyor passes over a series of sprockets 14a.

The trays in this second modification of combined cabinet and oven have resistance heat units 23 incorporated in the body of the tray. In order to heat the trays at desired positions in their travel around on the conveyor, sections of electrified track 24 are shown at desired positions. The current to the electrified track sections, is controlled by means of a series of thermostats 16a, and as in the first described modification, the electrified track sections are controlled by temperature conditions remote from the position in which the track sections are located.

In Figures 7 and 8, a split yoke 12b provides the journal support for the tray 23a having the heating elements 23'. On the electrified track section 24 runs a conductive roller 25 which contacts with a brush 26 connected by a wire 26' with the heating elements 23', to energize the elements 23' as the tray is moving along the electrified track sections. In Figs. 11 and 12, wires 23b run from the heat units 23' to respective spring tongues 23c inward from and opposite the centers of the hooks 12a. The conductive rollers 25a turn on outward extensions of the hollow shafts 11a, running on the track sections 24a and being in electrical contact with spring tongues 26. Between the tongue 26 and the tongue 23c a contacting rod 27 extends through the hollow shaft 11a and is insulated therefrom. Thus the tray 17a may be unhooked from the hollow shaft 11a or hooked thereon, and the spring tongue 23c will break or make contact as the case may be, with the rod 11a; so that when the tray is mounted on the conveyor, its heat element 23a automatically is energized from the electrified track section 24a.

Thus removably mounted for automatic electrical connection and disconnection, the trays have their heating controlled by the thermostats 16a as above described. As a further modification, we have indicated a thermal cut-out 29 in the tray itself, as shown in Figure 11 so that if the tray becomes so hot as to be in danger of its heating element 23a burning out, this cut-out 29 will automatically cut off the current independently of the control exercised by the thermostats 16a along the path of travel.

By controlling the temperature of the ingredients going into the molded loaf, and by careful mixing, it can be predetermined how long the molded loaf should remain in the proofing cabinet. By setting the thermostats it will be obvious that baking conditions can be varied throughout a wide range, and by means of the end or side loading of the proofing cabinet for special batches of doughs, it will be possible to vary the time of travel through the cabinet.

Since individual compartments can be used as proofer, oven or cooler, in addition to accurately controlling temperatures in these relatively small compartments, it also is easy to vary the proportionate time of proofing, baking and cooling. Our arrangement also makes it possible thru proper setting of the thermostatic controls to brown the products quickly in the first oven units thru which they pass and then complete the baking slowly; or the first units can be heated to a lower degree of temperature, giving a chance for the products being baked to expand under relatively low heat and other compartments can be set for a higher or lower degree, depending on the type of goods being baked and the exact results desired.

In Figures 12 and 13 we have shown another modification of our apparatus, working on the same principle, but in which the compartment construction has been used to a greater extent than in the previous examples, and in which the choice of duty assigned to the various compartments is more liberal than in the previous examples. Because of this, in this example of Figures 13 and 14, no compartment is designated either as a proofing or as a baking compartment; it being understood that any one or any number of these compartments 1b intermediate of the ends of the structure, or compartments 1c and 1d at the ends may be used either for proofing or baking, or for cooling, after the manner hereinbefore pointed out, by means of the heat units 15b controlled by thermostats 16b. It will be understood that the intermediate parts of this structure, omitted for lack of space, are simply duplicates of the compartments 1b and their associated details.

On the top of the end section or compartment 1c is a suitable exhaust apparatus 3, which has a pipe 3' with branches 3" leading to it from the compartment 1c and several succeeding compartments 1b (Figure 13). At the opposite end a vent pipe 3a leads up from the top of the end compartment 1d, and has a pipe 3b with branches 3c leading from several preceding compartments 1b (Figure 14).

These various compartments 1c, 1b and 1d, are defined by the walls terminating up from the bottom of the structure, leaving an opening as 4'. This example also shows how the structure may be provided in sections, each section 1b having its opposite end walls 4b formed as just described, and the end sections 1c and 1d having their inner walls 4c and 4d, respectively, formed in the same way; so that the sections may be arranged end to end and each two meeting section walls will together make up the wall dividing two compartments.

The conveying mechanism of this example will be understood to be constructed after the manner of any of the examples hereinbefore described, and the motor 5b is shown with its reducing gearing 6b driving a worm 7b which drives a worm gear 8b fixed on the same shaft with the main driving sprocket wheels 9b, driving the conveyor chains 10b, traveling around the series of sprocket wheels 14b, each one in the middle of the upper part of a compartment, and sprocket wheels 14c, each one journaled just below the lower edge of a wall between two compartments. These chains carry the trays 17b, which will be understood to be trays of any of the kinds that have been described herein. The structure also is provided with the baffle 20b throughout the bottoms of the sections, for the purpose of creating humidity as described in connection with the previous examples. As seen in Figure 14 a blower apparatus is provided, comprising the outside motor driven blower 30, to which a pipe 31 leads from within the structure, running along under the lower edges of the compartment walls, and having upwardly opening branches 32 in the respective compartments, each preferably provided with a damper 33. This apparatus may be used for forcing cooling air into the compartments.

From what has been explained previously, it will be seen that the machine, in principle, consists of a series of compartments through which the loaves travel, to be subject to proofing and baking operations in varying proportions, and also if desired, subject to cooling in such proportion to the other apparatus as may be desirable. For instance, if the apparatus comprised twelve compartments, the first six of these might be used as proofing compartments, and the last six as baking compartments. Under other conditions, or if different timing was necessary, possibly only the first four compartments would be used for proofing, and the next six for baking, and the last two for cooling. Almost any combination is possible in this way.

A very short proof with a long, slow bake can be secured or a very long proof and a quick bake, or the entire unit can be regulated in speed and approximately an equal proofing and baking time secured with each baking unit controlled to give quick browning and slow baking or the reverse, as well as any intermediate arrangement.

Any section or compartment can be cut off and if the last compartments are turned off in this way the baked goods simply travel thru them, in which case they constitute cooling compartments and the provisions can be used as described for drawing off warm air or introduction of cooling air in such compartments.

While we have shown particularly electric units for heating the oven, the heat units may either be gas or steam, or other controlled means, it being within the scope of our invention to vary the detailed construction shown, as long as inventive principles suggested are utilized.

Having thus described our invention, what we claim as new and desire to secure by Letters Patent, is:—

1. In apparatus of the character described, an enclosure having a plurality of distinct compartments, means for conveying loaves through said compartments, said conveying means having a return stretch past said compartments, and means coactive with said return stretch for varying atmospheric conditions in said compartments.

2. In combination with a baking oven, a conveyor, a tray, a pivot by means of which said tray is swingingly mounted on said conveyor, a heating unit on said tray, an element near the path of travel of the tray to supply energy to said heating unit, and means whereby said element supplies the energy of the heating unit through said pivot.

3. In combination with a baking oven, a conveyor, a tray, a pivot by means of which said tray is swingingly and removably mounted on said conveyor, a heating unit on said tray, an element near the path of travel of the tray to supply energy to said heating unit, and means separable upon removal of said tray from said conveyor whereby said element supplies the energy of the heating unit through said pivot.

4. In combination with a baking oven, a conveyor having a pivotal extension, a tray having a hook to removably engage over said extension, an electrical heating unit on said tray, an element near the path of travel of the tray to supply current to said unit, and an electrical connection from said element to said unit comprising parts with a separable contact at said pivotal extension.

5. In a baking oven comprising a conveyor traveling through said oven, a series of trays carried by said conveyor, and means for heating the trays intermittently in their travel, thermostats, each controlling the operation of a respective heating means and located to be passed by each tray before the tray is subjected to the action of the respective heating means.

6. In a baking oven comprising a conveyor traveling through said oven, a series of trays carried by said conveyor, and heaters at intervals along the path of the trays, thermostats, each controlling the operation of a respective heater and located to be passed by each tray before the tray passes the respective heater.

7. In a baking oven comprising a conveyor traveling through said oven, a series of trays carried by said conveyor, heating units in the trays, electrified track sections, and means conducting electric current from the track sections to the heating units as the trays pass the track sections, thermostats, each controlling the conduction of current to a respective track section and located to be passed by the trays as the trays approach the respective track sections.

8. In proofing and baking apparatus comprising a proofing compartment, a baking compartment, and a conveyor traveling through said compartments and being heated in the baking compartment, said conveyor returning through said compartments, and means in the proofing compartment for applying moisture adjacent to the returning conveyor to be heated thereby.

9. In apparatus of the character described, an enclosure made up of a number of units each comprising sides, a top, and end walls, at least one end wall of each unit being shorter than the sides thereof with its lower edge up a substantial distance from the bottoms of the side walls, said units being assembled with said end walls, thus brought together, forming a baffle defining compartments in the upper part of the enclosure and leaving a passage in the lower part of the enclosure, communicating upwardly with said compartments.

10. The method of proofing loaves for baking which comprises subjecting loaves being proofed to the heat from freshly baked loaves.

11. The method of proofing loaves for baking which comprises subjecting loaves being proofed to the heat from freshly baked loaves, and exposing moisture to said heat in the presence of the loaves being proofed.

12. The method of proofing and baking loaves comprising conveying the loaves successively through a proofing atmosphere, through a baking atmosphere, and back through the proofing atmosphere, whereby the heat of the freshly baked loaves is applied to the proofing atmosphere and the baked loaves are cooled.

13. The method of proofing and baking loaves comprising conveying the loaves successively through a proofing atmosphere, through a baking atmosphere, and back through the proofing atmosphere, and supplying moisture in said proofing atmosphere, whereby the heat of the freshly baked loaves is applied to the proofing atmosphere and causes said moisture to humidify the atmosphere.

EDWARD J. LAUTERBUR.
FRANK X. LAUTERBUR.